US007152106B2

(12) United States Patent
Cohen et al.

(10) Patent No.: US 7,152,106 B2
(45) Date of Patent: Dec. 19, 2006

(54) USE OF VARIOUS METHODS TO RECONSTRUCT EXPERIENCES OF WEB SITE VISITORS

(75) Inventors: Tal Cohen, Tucker, GA (US); Nissim Harel, Tucker, GA (US); Vijaykumar Krishnaswamy, Atlanta, GA (US)

(73) Assignee: Clickfox, LLC, Atlanta, GA (US)

( * ) Notice: Subject to any disclaimer, the term of this patent is extended or adjusted under 35 U.S.C. 154(b) by 672 days.

(21) Appl. No.: 10/190,338

(22) Filed: Jul. 5, 2002

(65) Prior Publication Data

US 2004/0205586 A1    Oct. 14, 2004

Related U.S. Application Data

(60) Provisional application No. 60/303,684, filed on Jul. 6, 2001.

(51) Int. Cl.
*G06F 15/00* (2006.01)
(52) U.S. Cl. ............... 709/224; 709/203; 709/204; 709/205; 709/218; 709/219; 709/223; 709/224; 715/513; 715/736; 707/102
(58) Field of Classification Search ........ 709/223–224, 709/225, 226, 227, 238, 239, 203–205, 218–219; 715/513, 736; 707/102
See application file for complete search history.

(56) References Cited

U.S. PATENT DOCUMENTS

| 5,870,559 | A | 2/1999 | Leshem et al. |
| 6,073,135 | A | 6/2000 | Broder et al. |
| 6,230,153 | B1 | 5/2001 | Howard et al. |
| 6,549,944 | B1 * | 4/2003 | Weinberg et al. ............ 709/224 |
| 6,633,316 | B1 * | 10/2003 | Maddalozzo et al. ........ 715/854 |
| 6,999,990 | B1 * | 2/2006 | Sullivan et al. ............. 709/205 |
| 7,003,528 | B1 * | 2/2006 | Dan et al. .................... 707/102 |
| 2002/0083067 | A1 * | 6/2002 | Tamayo et al. ............. 707/100 |
| 2002/0130907 | A1 * | 9/2002 | Chi et al. ................... 345/853 |
| 2002/0152237 | A1 * | 10/2002 | Cohen et al. ............... 707/513 |
| 2003/0217117 | A1 * | 11/2003 | Dan et al. .................... 709/218 |
| 2004/0148568 | A1 * | 7/2004 | Springer ..................... 715/513 |

FOREIGN PATENT DOCUMENTS

WO    WO 01/35222    5/2001

OTHER PUBLICATIONS

PCT International Search Report for International Application No. PCT/US02/21410.

* cited by examiner

*Primary Examiner*—David Wiley
*Assistant Examiner*—Alina Boutah
(74) *Attorney, Agent, or Firm*—Troutman Sanders LLP; James E. Schutz

(57) ABSTRACT

A method of reconstruction of data gathered from Internet web sites and, more specifically, the reconstruction of data regarding the experiences of Internet users at particular web sites for determining the utilization of a respective web site.

10 Claims, 3 Drawing Sheets

USE OF VARIOUS METHODS TO RECONSTRUCT EXPERIENCES OF WEB SITE VISITORS

PRIORITY

This application claims priority from provisional application filed Jul. 6, 2001, having Ser. No. 60/303,684 entitled "Use Of Various Methods To Reconstruct Experiences Of Web Site Visitors."

TECHNICAL FIELD

This invention pertains to the field of reconstruction of data gathered from Internet web sites and, more specifically, the reconstruction of data regarding the experiences of Internet users at particular web sites for determining the utilization of a respective web site.

BACKGROUND OF THE INVENTION

Parties (or hosts) that construct and maintain web sites on the World Wide Web (i.e., the Internet) generally wish to structure their web sites (the site) so as to accomplish certain goals with regards to the web site's visitors. Sometimes the goal may be to encourage a visitor to stay at the site for a maximum amount of time. Other times the goal may be to allow the visitor to quickly and easily access or purchase a certain amount of products, images or items. A tool that monitored visitor activity on a web site would benefit a web site host in that the host could modify the web site based on visitor activity to encourage visitors to access certain pages, hypertext items, images, and other objects, or to take other particular actions. Such encouragement could be accomplished through modifying the web site to make it more productive and more appealing. Such a tool that monitored visitor activity would also be beneficial for a wide range of other purposes.

Currently, however, such a tool for monitoring visitor activity does not exist. Tools presently used for monitoring visitor activities result in partial records (or visitor activity logs) that may have numerous and, sometimes large, gaps in information regarding user behavior. Such gaps or incomplete information in visitor activity logs, for example, are often created through a visitor's use of browsers that store documents and do not reload such documents every time a visitor requests it, a web site's use of frame based templates and the use of proxies on the Internet by servers to avoid delays and reduce network traffic. Numerous other "shortcuts" or "time savers" cause the actual data recovered regarding visitor behavior to differ from the true visitor activity. This situation is further complicated by issues like multiple document downloads from the server for every user request (e.g., for framesets or popups). The recent advancement of Internet technologies, like the widespread adoption of dynamic HTML (i.e., DHTML) and the wide spread use of active components in the web pages (e.g., scripts, forms and embedded objects like applets and flash objects) have further widened the chasm between the user experience and the visitor activity log recorded at the web server. Moreover, other methods used to record visitor experience while interacting with a web site such as listeners and web bugs are either cumbersome to implement or intrusive on the visitors and hence are not practical means of recording user experiences. Even if these methods are implemented, for the above mentioned reasons, they are generally still ineffective and have difficulty in exactly capturing the visitors full interaction with the site. Consequently, a method is needed that takes available information and reconstructs a visitor's experience in a manner that is useful to the web site's host and accurate within an acceptable margin of error.

SUMMARY OF THE INVENTION

This invention presents a method of reconstruction of data gathered from Internet web sites and, more specifically, the reconstruction of data regarding the experiences of Internet users at particular web sites for determining the utilization of a respective web site.

The method entails determining a visitor's travel path through a web site consisting of multiple web pages by retrieving a data record containing a partial record of steps and reconstructing missing steps through the application of logical sequences where the path is all steps taken by a web site user from web page to web page and steps are a pair of web pages consisting of a source web page and a destination web page.

This invention may be used by, or use techniques detailed in, the following applications, which are hereby incorporated herein by reference: "System And Method For Providing Customized Web Pages" (application Ser. No. 09/778,562); "Graphical User Interface And Web Site Evaluation Tool For Customizing Web Sites" (application Ser. No. 10/005,182); and "System And Method For Analyzing Web Site Visitor Activities And Customizing Web Pages" filed contemporaneously with this application that is the non-provisional version of provisional Application No. 60/303,683.

The construction designed to carry out the invention will hereinafter be described together with other features thereof. The invention will be more readily understood from a reading of the following specification and by reference to the accompanying drawing forming a part thereof, wherein an example of the invention is shown and wherein from the detailed description of these, other more specific objects and features of the invention will become apparent.

DETAILED DESCRIPTION

Referring now in more detail the invention will be described below.

Currently, a web site host can retrieve records of user activity on their web sites through a variety of methods. One method that is popular includes retrieving the user activity log from a request log on a web site server. The server records visitor-request information (requester id, time, document name, browser name, etc.,) during its operation and stores such information in a file known as a request log. Unfortunately, programs used by visitor's to review web sites (i.e., browsers) will often store copies of particular web pages within its own system (memory or the local file system) and, therefore, not make a request to the server for the particular web page, but instead utilize the locally stored web page. Additionally, proxy servers may intercept requests sent to a web-server and return the appropriate web page that was stored on such proxy server during an earlier request from a different visitor. Further, there is not always a one-to-one correspondence between what a visitor experiences and the request that is received by the server. For example, documents that use frame based templates can lead to more than one web page request to the server or at other times less requests than needed to complete all the framed templates at a particular location. Consequently, for these and other reasons, the record of user activity at a web site is generally incomplete.

The present invention resolves the above-described partial-record problem by utilizing logical sequences to fill in gaps in the record that maintains a list of web pages visited by a visitor. A web site host may then rely on this list in determining visitor interaction with a web site. The invention also allows the host to adjust or insert logical sequences that add to the accuracy of the visitor logs based on the host's knowledge of its web site or other factors.

Figure 1:
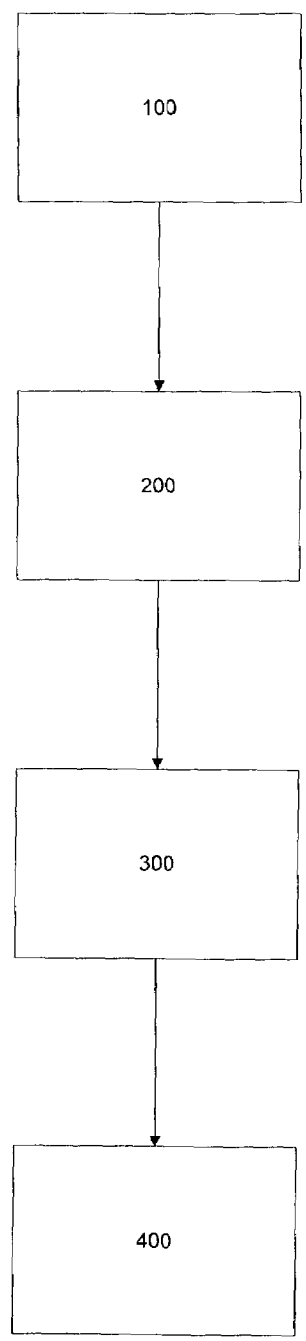
FIG. 1 is a flowchart detailing the steps performed in reconstructing visitor activity logs.

A first example illustrating the invention is shown in FIG. 1 which utilizes a web site where each web page only consists of one Internet address. Internet addresses may also be referred to as an Universal Resource Locator (or URL). A web site that consists only of this single type web page is considered a non-framed site. For a non-framed site, a visitor will travel from one web page to another web page and the visitor record will consist of a listing of pairs of single URLs or addresses. Because visitor activity is recorded as the actual travel from web page to web page, the visitor record consists of a pair of web page addresses—the source web page address and the destination web page address. This invention defines and refers to pair of addresses as a "step" taken by a visitor 100. The invention then defines a path as all steps taken by a web site user from web page to web page within the web site 200.

In the current preferred embodiment, the invention may be carried out by a combination of software, hardware or firmware. In this particular preferred embodiment, the invention will utilize software to retrieve a partial visitor record 300 and manipulate the data based on the logical sequences further detailed below 400. The visitor record restored by the present invention may then be utilized in a variety of ways to modify the web site so as to allow for more efficient utilization of the web site or for a number of other uses. For example, the restored visitor record may reveal that visitors take an elliptical path between two web pages when a more direct path is available. If a web site host knew of such information, it could modify the web pages to, perhaps, highlight the more direct path between the two web pages.

Figure 2:
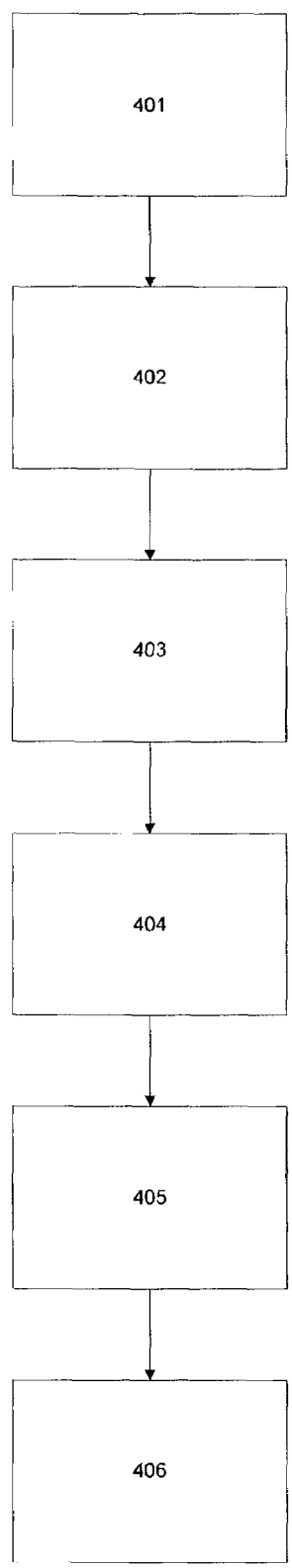
FIG. 2 is a flowchart detailing application of logical sequences to reconstruct visitor activity logs in non-framed web sites.

Illustrating the invention with a non-framed web site is shown in FIG. 2. In a non-framed version, the present preferred embodiment of the invention provides for six logical sequences 400. The invention applies each logical sequence, in sequence from the first logical sequence 401 to the sixth logical sequence 406, to the entire existing partial record with each application of an logical sequence potentially further supplementing the record. At each instance of an logical sequence application 400, the invention works with two contiguous elements at a time from the partial record to create the visitors path through the web site. During this process, the invention may add addresses to the record indicating a "step" (or steps) taken by the visitor in its travel through the web site or the record may be amended to show that no steps occurred and that the record is correct and complete for that portion. The invention is not limited to the logical sequences below or a particular method of application and the invention may also be carried out through variations to the type and number of logical sequences below and to the manner in which the logical sequences are applied.

The preferred embodiment of the invention for a non-framed version conducts the first logical sequence 401 by comparing each step in the retrieved partial record to the next step in the record to determine if a step is missing from the record. The invention performs this comparison by examining the destination web page of the proceeding step and the source web page of the subsequent step. If the addresses are identical, then the invention assumes that no step took place between the two compared steps. If the invention determines that no step exists between the two compared steps, the invention then inserts an indicator into the record that no step exists.

The invention then conducts the second logical sequence 402 by comparing each step in the record to the next step in the record when there is no indicator that no step exists between the two steps. During the comparison, the invention examines the destination web page of the proceeding step and the source web page of the subsequent step and the web site structure to determine if there is a direct path available between them such that no other web page must be first visited. If there is a direct path between the compared steps, then the invention assumes that a step exists between the two steps and that the new step consists of the proceeding step's destination web page and the subsequent step's source web page—i.e., the direct one step path. The invention then amends the record to place the new step between the proceeding and subsequent steps and places indicators between all three steps that no other steps exist between the three steps.

In various embodiments of the invention, the structure of the web site can also be used by the logical sequences in reconstructing the visitor record log. Frequently, a web site is constructed with a particular hierarchy to it. For example, most web sites have one particular page as the primary page and all other web pages at the site are accessed from or through this web page. This primary web page is often called the home page of the web site. Through understanding that the home page is often the first page visited at a site or that if it is not the first page visited, then the visitor is a returning user, the invention may be constructed so that the logical sequences are appropriately modified to reflect this understanding. Additionally, web site structures are often situated so that each web page (other than the home page) has a "parent," or a web page from which it is accessed. The accessed web page from a "parent" web page is often called the "child" web page of the "parent." Use of the existence of parent-child relationships at web sites can also aid in the construction or application of logical sequences.

For example, should a web site structure indicate parent-child relationships, the second logical sequence 402 could reconstruct a visitor activity log by assuming that a web page is generally accessed from its parent. Thus, if there is a parent-child relationship between two sequential web pages but no indication of travel between them, the second logical sequence 402 may be altered to insert a step indicating travel between the parent and child. Other modifications to the logical sequences will be obvious to one skilled in the art.

Although many logical sequences above detail that an indicator will be placed in the record when a determination that no step is missing from the record, other embodiments of the invention could consist of logical sequences that exist without placing such an indicator or that do not determine if such an indicator exists.

After completing the second logical sequence, the invention then conducts the third logical sequence 403 by comparing each step in the record to the next step in the record when there is no indicator that no step exists between the two steps. The invention performs the comparison by examining the source web page of the proceeding step and the source web page of the subsequent step to determine if the source web pages are identical. If the web pages are identical, then the invention assumes that the web site visitor used the "back" button available on its web browser software that allows travel from the last destination web page to the last source web page. In other words, the back button performs the previous step in reverse. This action then allows the visitor to travel to another destination web page from the previously visited web page. Often, the backwards travel is not recorded in a partial visitor log. The invention assumes that when the visitor traveled from the same page two times sequentially that it used the back button after its previous journey. Thus, after applying the third logical sequence and determining that the back button was used (or that the visitor traveled backwards using some other means), the invention amends the record to place the new step, consisting of the proceeding step's destination web page as the new step's source page and the subsequent step's source web page as the new step's destination page, between the proceeding and subsequent steps and places indicators between all three steps that no other steps exist between the three steps.

The invention's application of the third logical sequence can also be used to alert the invention to amend the record to place an indicator that a "back" button was used by the visitor during its visit to the web site at this location. The invention may sometimes also be designed to perform this logical sequence with all steps, or in some other manner, so as to supplement the record with details of when a "back" button was or may have been used by the visitor.

The invention then conducts the fourth logical sequence 404 by comparing each step in the record to the next step in the record when there is no indicator that no step exists between the two steps. Once the invention determines the lack of an indication that no steps exist between two steps, the invention further conducts this fourth logical sequence by examining the steps that took place prior to the currently compared steps. While examining the prior steps, the invention determines if any of the prior steps, or any of the prior steps performed in reverse, would allow the visitor to reach the compared pair's subsequent step's source web page from the compared pair's proceeding step's destination web page. If the invention finds any step or combination of steps that would allow for the visitor to travel between the compared pair, the invention then inserts the prior steps necessary to complete such a journey. The invention can be designed so that the fewest number of steps are inserted, the most recent steps that would allow for completion of the record are inserted or some other test is used to determine which steps are inserted into the record. Additionally, the invention could be designed so that it only examines a particular or limited number of prior steps. The invention then places indicators between the compared steps that no other steps exist between the two compared steps.

The invention then conducts the fifth logical sequence 405 by comparing each step in the record to the next step in the record when there is no indicator that no step exists between the two steps. Once the invention determines the lack of an indication that no steps exist between two steps, the invention further conducts this fifth logical sequence by examining the steps that took place subsequent to the currently compared steps. The invention determines if any of the subsequent steps, or any of the subsequent steps performed in reverse, would allow the visitor to reach the compared pair's subsequent step's source web page from the compared pair's proceeding step's destination web page. If the invention finds any step or combination of steps that would allow for the visitor to travel between the compared pair, the invention then inserts the subsequent steps necessary to complete such a journey. The invention can be designed so that the fewest number of steps are inserted, the steps performed most immediately afterwards that would allow for completion of the record are inserted or some other test is used to determine which steps are inserted into the record. Additionally, the invention could be designed so that it only examines a particular or limited number of subsequent steps. The invention then places indicators between the compared steps that no other steps exist between the two compared steps.

The invention then conducts the sixth logical sequence 406 by comparing each step in the record to the next step in the record when there is no indicator that no step exists between the two steps. During the comparison, the invention examines the destination web page of the proceeding step and the source web page of the subsequent step and the web site structure to determine what paths are available to complete a journey between them. The invention then assumes that the new step, or steps, consists of the necessary steps to complete the record. The invention can be designed so that the fewest number of steps are inserted or some other test is used to determine which steps are inserted into the record. The invention then amends the record to place the new step, or steps, between the proceeding and subsequent steps and places indicators between all steps that no other steps exist between the steps. The invention could be further designed to limit the number of steps added to the record, designed to further enhance the feasibility that application of this logical sequence results in the correct step or steps being inserted or designed in some other manner depending on the goal of reconstruction. For example, some users may wish the logical sequences to produce the most accurate records based on probability while others may define certain occurrences as absolute occurrences such as that the visitor always visits the web site's primary (i.e., home) page or use a "back" button.

As ones skilled in the art will note, the last logical sequence of any set of logical sequences is generally a default gap-filler that always fills the gap with a viable and logical sequence regardless of whether any of the prior logical sequences solved the visitor log inconsistency.

Other logical sequences may also be utilized by the invention to determine when a web site user utilized a particular device to travel from one web page to another. For example, a web site user may utilize a "back" button that allows it to travel back directly to the previously visited web page. Another example could be when a web site user uses a "home" or "favorites" button that take the user to a particular page (i.e., a page previously designated as a "home" or designated as a "favorite" page) without conversing on a normal path within the web site structure.

Logical sequences may also be constructed so that they take into account that a visitor may travel to more than one web pages as a result of a single action. For example, traveling to one web page may cause a second browser window to open showing a separate web page. These secondary or separate web pages are often defined as "pop-up" windows. Consequently, the user record may indicate that instead of a visitor traveling to one web page, the visitor traveled to two web pages-the requested page and a pop-up window. The invention may also define a step 100 as potentially consisting of a different amount of source web pages than destination web pages. One example of another logical sequence would be that upon the determination that the record reflects a different number of source web pages than destination web pages, a step is inserted wherein entry to a single web page results in the activity log reflecting multiple web pages. An understanding of the web site structure that only one web page or particular web pages allow the activation of a pop-up window can also aid in the record reconstruction.

Figure 3:
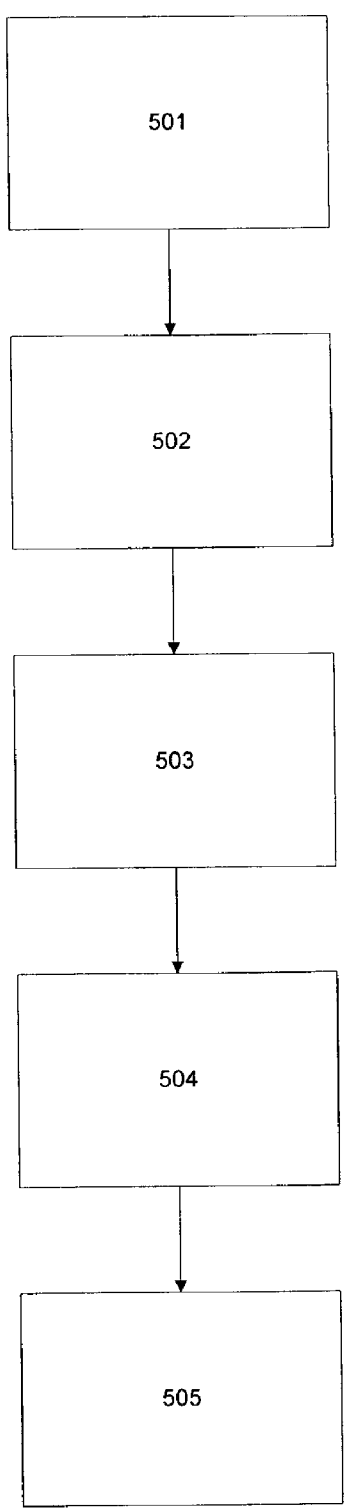
FIG. 3 is a flowchart detailing application of logical sequences to reconstruct visitor activity logs in framed web sites.

In a more complex application of the invention, the invention is applied to a framed web site. Illustrating the invention with a framed web site is shown in FIG. 3. Within a framed web site, a web page will consist of a set of one of more web pages displayed at once and framed in different parts of the single web page. Thus, the record will still indicate the step (or steps) taken by the visitor as they travel throughout the web site, however, each step may now consist of two sets of one or more web pages—a set of source web pages and a set of destination web pages. Therefore, a step will consist of one or more source web pages and one or more destination web pages. For example, a step may consist of a web page consisting of URLs "A", "B" and "C" as the source web page and the URLs "A", "D", and "E" as the destination web page.

The same type of alternatives to the invention or the application of the logical sequences that apply in the embodiment of the invention when examining non-framed web sites will also often apply in embodiments that examine or are used in conjunction with web sites that use frames.

In a framed version, the preferred embodiment of the invention provides for five logical sequences 400. The invention applies each logical sequence in sequence, from the first logical sequence 501 to the fifth logical sequence 505, to the entire existing partial record with each application of a logical sequence potentially further supplementing the record. At each instance of a logical sequence application, addresses may be added to the record indicating a "step" (or steps) taken by the visitor in his or her travel through the web site or the record may be amended to show that no steps occurred and that the record is correct and complete for that portion.

The preferred embodiment of the invention for a web site using frames conducts the first logical sequence 501 by comparing each step in the retrieved partial record to the next step in the record to determine if a step is missing from the record. The invention performs this comparison by examining the destination web page set of the proceeding step and the source web page set of the subsequent step. If the addresses are identical, then the invention assumes that no step took place between the two compared steps. If the invention determines that no step exists between the two compared steps, the invention then inserts an indicator into the record that no step exists.

The invention then conducts the second logical sequence 502 by comparing each step in the record to the next step in the record when there is no indicator that no step exists between the two steps. During the comparison, the invention examines the destination web page set of the proceeding step and the source web page set of the subsequent step and the web site structure to determine if there is a direct path available between them such that no other web page set must be first visited. If there is a direct path between the compared steps, then the invention assumes that a step exists between the two steps and that the new step consists of the proceeding step's destination web page set and the subsequent step's source web page set—i.e., the direct one step path. The invention then amends the record to place the new step between the proceeding and subsequent steps and places indicators between all three steps that no other steps exist between the three steps.

The invention then conducts the third logical sequence 503 by comparing each step in the record to the next step in the record when there is no indicator that no step exists between the two steps. Once the invention determines the lack of an indication that no steps exist between two steps, the invention further conducts this third logical sequence by examining the steps that took place subsequent to the currently compared steps. The invention determines if any of the subsequent steps, or any of the subsequent steps performed in reverse, would allow the visitor to reach the compared pair's subsequent step's source web page set from the compared pair's proceeding step's destination web page set. If the invention finds any step or combination of steps that would allow for the visitor to travel between the compared pair, the invention then inserts the subsequent steps necessary to complete such a journey. The invention can be designed so that the fewest number of steps are inserted, the steps performed most immediately afterwards that would allow for completion of the record are inserted or some other test is used to determine which steps are inserted into the record. Additionally, the invention could be designed so that it only examines a particular or limited number of subsequent steps. The invention then places indicators between the compared steps that no other steps exist between the two compared steps.

The invention then conducts the fourth logical sequence 504 by comparing each step in the record to the next step in the record when there is no indicator that no step exists between the two steps. Once the invention determines the lack of an indication that no steps exist between two steps, the invention further conducts this fourth logical sequence by examining the steps that took place prior to the currently compared steps. While examining the prior steps, the invention determines if any of the prior steps, or any of the prior steps performed in reverse, would allow the visitor to reach the compared pair's subsequent step's source web page set from the compared pair's proceeding step's destination web page set. If the invention finds any step or combination of steps that would allow for the visitor to travel between the compared pair, the invention then inserts the prior steps necessary to complete such a journey. The invention can be designed so that the fewest number of steps are inserted, the most recent steps that would allow for completion of the record are inserted or some other test is used to determine which steps are inserted into the record. Additionally, the invention could be designed so that it only examines a particular or limited number of prior steps. The invention then places indicators between the compared steps that no other steps exist between the two compared steps.

The invention then conducts the fifth logical sequence 505 by comparing each step in the record to the next step in the record when there is no indicator that no step exists between the two steps. During the comparison, the invention examines the destination web page set of the proceeding step and the source web page set of the subsequent step and the web site structure to determine what paths are available to complete a journey between them. The invention then assumes that the new step, or steps, consists of the necessary steps to complete the record. The invention can be designed so that the fewest number of steps are inserted or some other test is used to determine which steps are inserted into the record. The invention then amends the record to place the new step, or steps, between the proceeding and subsequent steps and places indicators between all steps that no other steps exist between the steps. The invention could be further designed to limit the number of steps added to the record, designed to further enhance the feasibility that application of this logical sequence results in the correct step or steps being inserted or designed in some other manner depending on the goal of reconstruction. For example, some users may wish the logical sequences to produce the most accurate records based on probability while others may define certain occurrences as absolute occurrences such as that the visitor always visits the web site's primary (i.e., home) page or use a "back" button or that particular frames are more prevalent than other frames.

The above discussed invention provides for a completion to a record based on logical sequences to give probabilistic chances of correctly completing the record. Changes to the invention may further supplement, utilize or alter the probabilistic outcomes.

Alternative embodiments will become apparent to those skilled in the art to which the present invention pertains without departing from its spirit and scope.

We claim:

1. A method of determining a user navigation path through a web site having a plurality of web pages, the user navigation path comprising one or more steps taken by a web site user from web page to web page within a website, each step comprising a source web page and a destination web page, the method comprising the steps of:
retrieving web site usage data containing a user navigation path record identifying a path taken by a web site user that navigated from a first web page to a second web page;
retrieving web site structural data identifying potential navigation paths for navigating from the first web page to the second web page;
reconstructing missing steps in the user navigation path record using the web site usage data and the web site structural data;
wherein the user navigation path record and the potential navigation paths identify one or more steps between a source web page and a destination web page, the method further comprising the steps of:
comparing each step's destination web page to the source web page of the immediate subsequent step for all pairs of steps in the user navigation path record when there is no indication that no step is missing between said step pairs in the user navigation path record;
amending the user navigation path record to insert a new step between compared step pairs consisting of the proceeding step's destination web page as said new step's source web page and the subsequent step's source web page as said new step's destination web page when in a compared step pair there is a one step path from the proceeding step's destination web page to the subsequent step's source web page; and
amending the user navigation path record to indicate that no other step separates said compared step pairs when a new step was inserted.

2. A method of determining a user navigation path through a web site having a plurality of web pages, the user navigation path comprising one or more steps taken by a web site user from web page to web page within a website, each step comprising a source web page and a destination web page, the method comprising the steps of:
retrieving web site usage data containing a user navigation path record identifying a path taken by a web site user that navigated from a first web page to a second web page;
retrieving web site structural data identifying potential navigation paths for navigating from the first web page to the second web page;
reconstructing missing steps in the user navigation path record using the web site usage data and the web site structural data;
wherein the user navigation path record and the potential navigation paths identify one or more steps between a source web page and a destination web page, the method further comprising the steps of:
comparing each step's source web page to the source web page of the immediately subsequent step for all pair of steps in the user navigation path record when there is no indication that no step is missing between said step pairs in the user navigation path record;
amending the user navigation path record to insert a new step between compared step pairs consisting of the proceeding step's destination web page as said new step's source web page and the subsequent step's source web page as said new step's destination web page when in a compared step pair the source web pages are the same web page; and
amending the user navigation path record to indicate that no other step separates said compared step pairs when a new step was inserted.

3. The method of claim 2, wherein the method further comprises determining when said web site user utilized a device to return to a web page visited immediately prior to visiting a second web page; and
amending the user navigation path record to show when said device was used.

4. A method of determining a user navigation path through a web site having a plurality of web pages, the user navigation path comprising one or more steps taken by a web site user from web page to web page within a website, each step comprising a source web page and a destination web page, the method comprising the steps of:
retrieving web site usage data containing a user navigation path record identifying a path taken by a web site user that navigated from a first web page to a second web page;
retrieving web site structural data identifying potential navigation paths for navigating from the first web page to the second web page;
reconstructing missing steps in the user navigation path record using the web site usage data and the web site structural data;
wherein the user navigation path record and the potential navigation paths identify one or more steps between a source web page and a destination web page, the method further comprising the steps of:
comparing each step's destination web page to the source web page of the immediately subsequent step for all pair of steps in the user navigation path record when there is no indication that no step is missing between said step pairs in the user navigation path record;
examining steps proceeding each said compared pair of steps to determine whether inserting one of more of said proceeding steps, or said proceeding steps in which proceeding steps' destination web page and source web page are interchanged, would allow a path from the compared pair's proceeding step's destination web page to the subsequent step's source web page;

determining a minimum number of said proceeding steps, and said proceeding steps in which proceeding steps' destination web page and source web page are interchanged, needed to complete the path between the steps of said compared pair and amending the user navigation path record to insert said minimum number of new steps between said compared step pairs when said examination shows steps that will allow a path between said compared steps; and amending the user navigation path record to indicate that no other step separates said compared step pairs when any new steps are inserted.

5. A method of determining a user navigation path through a web site having a plurality of web pages, the user navigation path comprising one or more steps taken by a web site user from web page to web page within a website, each step comprising a source web page and a destination web page, the method comprising the steps of:

retrieving web site usage data containing a user navigation path record identifying a path taken by a web site user that navigated from a first web page to a second web page;

retrieving web site structural data identifying potential navigation paths for navigating from the first web page to the second web page;

reconstructing missing steps in the user navigation path record using the web site usage data and the web site structural data;

wherein the user navigation path record and the potential navigation paths identify one or more steps between a source web page and a destination web page, the method further comprising the steps of:

comparing each step's destination web page to the source web page of the immediately subsequent step for all pair of steps in the user navigation path record when there is no indication that no step is missing between said step pairs in the user navigation path record;

examining steps subsequent to each said compared pair of steps to determine whether inserting one of more of said subsequent steps, or said subsequent steps in which subsequent steps' destination web page and source web page are interchanged, would allow a path from the compared pair's proceeding step's destination web page to the subsequent step's source web page;

determining a minimum number of said subsequent steps, and said subsequent steps in which subsequent steps' destination web page and source web page are interchanged, needed to complete the path between the steps of said compared pair and amending the user navigation path record to insert said minimum number of new steps between said compared step pairs when said examination shows steps that will allow a path between said compared steps; and amending the user navigation path record to indicate that no other step separates said compared step pairs when any new steps are inserted.

6. A method of determining a user navigation path through a web site having a plurality of web pages, the user navigation path comprising one or more steps taken by a web site user from web page to web page within a website, each step comprising a source web page and a destination web page, the method comprising the steps of:

retrieving web site usage data containing a user navigation path record identifying a path taken by a web site user that navigated from a first web page to a second web page;

retrieving web site structural data identifying potential navigation paths for navigating from the first web page to the second web page;

reconstructing missing steps in the user navigation path record using the web site usage data and the web site structural data;

wherein each step comprises a two sets of one or more web pages comprising a source web page set and a destination web page set and wherein the step of reconstructing missing steps in the user navigation path further comprises:

comparing each step's destination web page set to the source web page set of the immediate subsequent step for each pair of steps when there is no indication that no step is missing between said step pairs in the user navigation path record;

amending the user navigation path record to insert a new step between compared step pairs consisting of the proceeding step's destination web page set as said new step's source web page set and the subsequent step's source web page set as said new step's destination web page set when in a compared step pair there is a one step path from the proceeding step's destination web page set to the subsequent step's source web page set; and amending the user navigation path record to indicate that no other step separates said compared step pairs when a new step was inserted.

7. A method of determining a user navigation path through a web site having a plurality of web pages, the user navigation path comprising one or more steps taken by a web site user from web page to web page within a website, each step comprising a source web page and a destination web page, the method comprising the steps of:

retrieving web site usage data containing a user navigation path record identifying a path taken by a web site user that navigated from a first web page to a second web page;

retrieving web site structural data identifying potential navigation paths for navigating from the first web page to the second web page;

reconstructing missing steps in the user navigation path record using the web site usage data and the web site structural data;

wherein each step comprises a two sets of one or more web pages comprising a source web page set and a destination web page set and wherein the step of reconstructing missing steps in the user navigation path further comprises:

comparing each step's destination web page set to the source web page set of the immediately subsequent step for each pair of steps when there is no indication that no step is missing between said step pairs in the data record;

examining steps subsequent to each said compared pair of steps to determine whether inserting one of more of said subsequent steps would allow a path from the compared pair's proceeding step's destination web page set to the subsequent step's set source web page;

determining a minimum number of said subsequent steps needed to complete the path between the steps of said compared pair and amending the data record to insert said minimum number of new steps between said compared step pairs when said examination shows steps that will allow a path between said compared steps; and amending the data record to indicate that no other step separates said compared step pairs when any new steps are inserted.

8. A method of determining a user navigation path through a web site having a plurality of web pages, the user navigation path comprising one or more steps taken by a web site user from web page to web page within a website, each step comprising a source web page and a destination web page, the method comprising the steps of:

retrieving web site usage data containing a user navigation path record identifying a path taken by a web site user that navigated from a first web page to a second web page;

retrieving web site structural data identifying potential navigation paths for navigating from the first web page to the second web page;

reconstructing missing steps in the user navigation path record using the web site usage data and the web site structural data;

wherein each step comprises a two sets of one or more web pages comprising a source web page set and a destination web page set and wherein the step of reconstructing missing steps in the user navigation path further comprises:

comparing each step's destination web page set to the source web page set of the immediately subsequent step for each pair of steps when there is no indication that no step is missing between said step pairs in the data record;

examining steps proceeding each said compared pair of steps to determine whether inserting one of more of said proceeding steps, or said proceeding steps in which proceeding steps' destination web page set and source web page set are interchanged, would allow a path from the compared pair's proceeding step's destination web page set to the subsequent step's source web page set;

determining a minimum number of said proceeding steps, and said proceeding steps in which proceeding steps' destination web page set and source web page set are interchanged, needed to complete the path between the steps of said compared pair and amending the data record to insert said minimum number of new steps between said compared step pairs when said examination shows steps that will allow a path between said compared steps; and amending the data record to indicate that no other step separates said compared step pairs when any new steps are inserted.

9. A method of determining a travel path through a web site having a plurality of web pages, the method comprising the steps of:

defining a path as one or more steps taken by a web site user in navigating from web page to web page within a web site;

defining each step as a pair of web pages consisting of a source web page and a destination web page;

retrieving a data record containing a partial record of steps;

reconstructing missing steps in the path through comparing each step's source web page to the destination web page of the immediately prior step;

amending the data record to indicate that no step separates two steps in which a step's source web page and the prior step's destination web page are the same location;

then, reconstructing missing steps in the path through comparing each step's destination web page to the source web page of the immediate subsequent step for all pairs of steps when there is no indication that no step is missing between said step pairs in the data record;

amending the data record to insert a new step between compared step pairs consisting of the proceeding step's destination web page as said new step's source web page and the subsequent step's source web page as said new step's destination web page when in a compared step pair there is a one step path from the proceeding step's destination web page to the subsequent step's source web page;

amending the data record to indicate that no other step separates said compared step pairs when a new step was inserted;

then, reconstructing missing steps in the path through comparing each step's source web page to the source web page of the immediately subsequent step for all pair of steps when there is no indication that no step is missing between said step pairs in the data record;

amending the data record to insert a new step between compared step pairs consisting of the proceeding step's destination web page as said new step's source web page and the subsequent step's source web page as said new step's destination web page when in a compared step pair the source web pages are the same web page;

amending the data record to indicate that no other step separates said compared step pairs when a new step was inserted;

then, reconstructing missing steps in the path through comparing each step's destination web page to the source web page of the immediately subsequent step for all pair of steps when there is no indication that no step is missing between said step pairs in the data record;

examining steps proceeding each said compared pair of steps to determine whether inserting one of more of said proceeding steps, or said proceeding steps in which proceeding steps' destination web page and source web page are interchanged, would allow a path from the compared pair's proceeding step's destination web page to the subsequent step's source web page;

determining a minimum number of said proceeding steps and said proceeding steps in which proceeding steps' destination web page and source web page are interchanged needed to complete the path between the steps of said compared pair and amending the data record to insert said minimum number of new steps between said compared step pairs when said examination shows steps that will allow a path between said compared steps;

amending the data record to indicate that no other step separates said compared step pairs when any new steps are inserted;

then, reconstructing missing steps in the path through comparing each step's destination web page to the source web page of the immediately subsequent step for all pair of steps when there is no indication that no step is missing between said step pairs in the data record;

examining steps subsequent to each said compared pair of steps to determine whether inserting one of more of said subsequent steps, or said subsequent steps in which subsequent steps' destination web page and source web page are interchanged, would allow a path from the compared pair's proceeding step's destination web page to the subsequent step's source web page;

determining a minimum number of said subsequent steps, and said subsequent steps in which subsequent steps' destination web page and source web page are interchanged, needed to complete the path between the steps of said compared pair and amending the data record to insert said minimum number of new steps between said compared step pairs when said examination shows steps that will allow a path between said compared steps;

amending the data record to indicate that no other step separates said compared step pairs when any new steps are inserted;

then, reconstructing missing steps in the path through comparing each step's destination web page to the source web page of the immediately subsequent step for all pair of steps when there is no indication that no step is missing between said step pairs in the data record;

examining the structure of the web site to determine a minimum number of steps needed to complete a path between the compared pair's proceeding step's destination web page to the subsequent step's source web page; and amending the data record to insert said minimum number of new steps between said compared step pairs.

10. A method of determining a travel path through a web site having a plurality of web pages wherein a web page may consist of one or more web pages displayed at once and framed in different parts of said web page, the method comprising the steps of:

defining a path as one or more steps taken by a web site user in navigating from web page to web page within a web site;

defining each step as two sets of one or more web pages consisting of a source web page set and a destination web page set;

retrieving a data record containing a partial record of steps;

reconstructing missing steps in the path through comparing each step's source web page set to the destination web page set of the immediately prior step;

amending the data record to indicate that no step separates two steps in which a step's source web page set and the prior step's destination web page set are the same location;

then, reconstructing missing steps in the path through comparing each step's destination web page set to the source web page set of the immediate subsequent step for all pair of steps when there is no indication that no step is missing between said step pairs in the data record;

amending the data record to insert a new step between compared step pairs consisting of the proceeding step's destination web page set as said new step's source web page set and the subsequent step's source web page set as said new step's destination web page set when in a compared step pair there is a one step path from the proceeding step's destination web page set to the subsequent step's source web page set;

amending the data record to indicate that no other step separates said compared step pairs when a new step was inserted;

then, reconstructing missing steps in the path through comparing each step's destination web page set to the source web page set of the immediately subsequent step for all pair of steps when there is no indication that no step is missing between said step pairs in the data record;

examining steps subsequent to each said compared pair of steps to determine whether inserting one of more of said subsequent steps would allow a path from the compared pair's proceeding step's destination web page set to the subsequent step's set source web page;

determining a minimum number of said subsequent steps needed to complete the path between the steps of said compared pair and amending the data record to insert said minimum number of new steps between said compared step pairs when said examination shows steps that will allow a path between said compared steps;

amending the data record to indicate that no other step separates said compared step pairs when any new steps are inserted then, reconstructing missing steps in the path through comparing each step's destination web page set to the source web page set of the immediately subsequent step for all pair of steps when there is no indication that no step is missing between said step pairs in the data record;

examining steps proceeding each said compared pair of steps to determine whether inserting one of more of said proceeding steps, or said proceeding steps in which proceeding steps' destination web page set and source web page set are interchanged, would allow a path from the compared pair's proceeding step's destination web page set to the subsequent step's source web page set;

determining a minimum number of said proceeding steps and said proceeding steps in which proceeding steps' destination web page set and source web page set are interchanged needed to complete the path between the steps of said compared pair and amending the data record to insert said minimum number of new steps between said compared step pairs when said examination shows steps that will allow a path between said compared steps;

amending the data record to indicate that no other step separates said compared step pairs when any new steps are inserted;

then, reconstructing missing steps in the path through comparing each step's destination web page set to the source web page set of the immediately subsequent step for all pair of steps when there is no indication that no step is missing between said step pairs in the data record;

examining the structure of the web site to determine a minimum number of steps needed to complete a path between the compared pair's proceeding step's destination web page set to the subsequent step's source web page set; and amending the data record to insert said minimum number of new steps between said compared step pairs.

* * * * *